Dec. 26, 1961     A. D. DE VRIES ET AL     3,014,973
OLEFIN SEPARATION AND PURIFICATION PROCESS
Filed Nov. 27, 1959
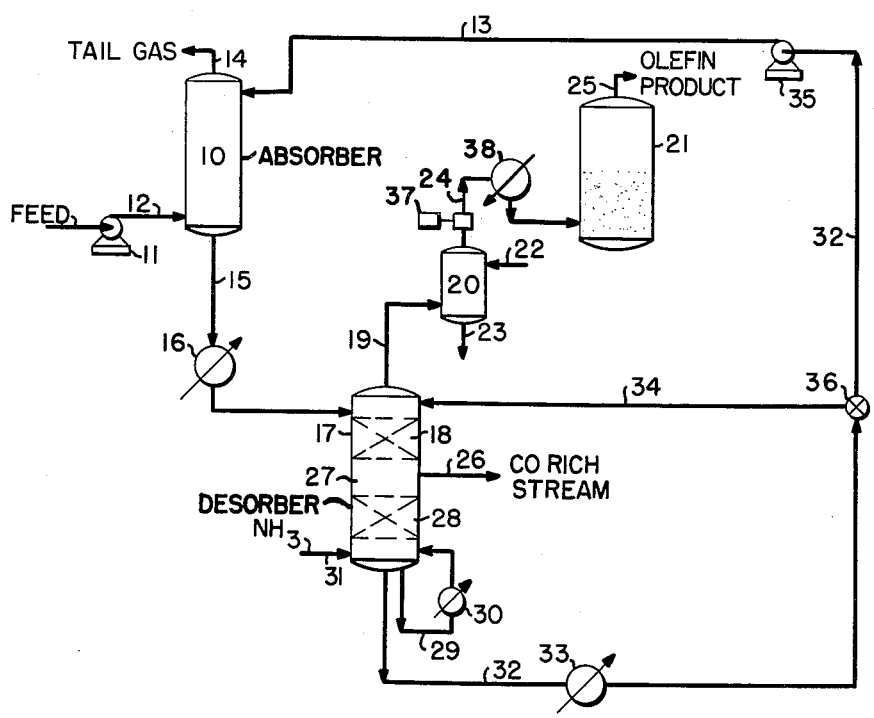
Arthur Douwe de Vries
Merlan Meredith Lambert    Inventors
By R. D. Manahan
Patent Attorney

3,014,973
OLEFIN SEPARATION AND PURIFICATION PROCESS
Arthur Douwe de Vries and Merlan Meredith Lambert, Baton Rouge, La., assignors to Esso Research and Engineering Company, a corporation of Delaware
Filed Nov. 27, 1959, Ser. No. 855,692
5 Claims. (Cl. 260—677)

The present invention relates to the separation and purification of olefins, especially low molecular weight olefins. More particularly, it concerns selectively absorbing an olefin and carbon monoxide from a light hydrocarbon stream, subsequently separating the olefin from the carbon monoxide and then purifying the separated olefin.

The selective affinity of cuprous salt solutions for olefins is well known in the art. In general, the olefins are selectively absorbed from an olefin-bearing stream at ambient or lower temperatures and desorbed at higher temperatures. However, in concentrating ethylene or ethylene and propylene in refinery streams with selective solvents, such as cuprous solutions, the solvents (or absorbents) become contaminated with carbon monoxide which is often present in light olefin streams. If the carbon monoxide is not substantially removed from the solution after it is stripped of olefin, a build up will occur which eventually reduces the effectiveness of the absorbent, and, if the absorbent is not cleaned up, contamination of the olefin product with carbon monoxide results.

A principal object of the present invention is the provision of a method for effecting the separation of ethylene or ethylene and propylene from carbon monoxide. Another object is to provide a method which avoids contamination of the absorbent with carbon monoxide by removing it from the absorbent before it is recycled to the absorption zone.

In accordance with the present invention, a $C_2$ to $C_3$ olefin-bearing stream contaminated with carbon monoxide is contacted, preferably countercurrently, with an alkaline cuprous salt solution at approximately ambient or preferably a lower temperature so that it selectively removes the olefin from said stream together with substantially all of the carbon monoxide. The rich solution is transferred to a desorbing or stripping zone in which most of the absorbed olefin is taken off at a higher temperature than that employed in the absorption zone and the lean cuprous salt solution is then cleaned up by removing a major proportion of the absorbed carbon monoxide from the absorbent at still a higher temperature or under such other conditions which favor its removal. A part of the lean solution may be recycled to the absorption zone to assist in the separation of the olefin product from the carbon monoxide absorbed in the fat solution. The product can be further purified with an alkali metal hydroxide, such as sodium or potassium hydroxide. If desired, any olefin in the carbon monoxide rich side stream may be recovered by reabsorption in lean absorbent which may then be selectively stripped again to first liberate the absorbed olefin and last the carbon monoxide.

A number of the olefin-bearing streams from refinery processes, e.g. a noncatalytic thermal cracking process, contain substantial amounts of acetylenes, such as acetylene ($C_2H_2$) and methyl acetylene ($C_3H_4$). The acetylenes cause difficulties because they polymerize and form explosive copper acetylides with the absorbent. A pretreatment step which substantially eliminates the acetylenes from the olefin-bearing stream should therefore be employed before the stream is fed into the absorption zone of the present process. A suitable pretreatment process involves the selective hydrogenation of the acetylenes to ethylene and ethane. By this pretreatment process the acetylene content of the olefin-containing stream can be reduced from above 10,000 p.p.m. to less than 50 p.p.m. (by wt.) based on the olefin in the stream. The acetylenes may also be removed by other methods known in the art. The important thing is to remove any significant amount of acetylenes from the feed so that they will not interfere with the subsequent olefin concentration and purification steps.

The absorbent may be any of the cuprous salt solutions known to have an affinity for olefins, particularly ethylene. The solution should be alkaline and contain a small quantity of cupric ion to prevent corrosion of the treating vessels. A very satisfactory liquid absorbent is an ammoniacal cuprous acetate, the analysis of which is shown below:

| Component | Moles Per Liter | |
|---|---|---|
| | Broad Range | Preferred Range |
| Cupric copper | 0.1–0.8 | 0.3–.4 |
| Cuprous copper | 2.8–3.5 | 3.0–3.3 |
| Ammonia | 8.0–12.0 | 10.0–11.0 |
| Acetate (as acetic acid) | 3.5–4.5 | 4.0–4.5 |
| Water (average) | balance | 30 |

In general, the solvent is made up of a cuprous salt, a lower fatty acid radical, and an alkaline radical such as ammonium or an organic nitrogen base together with excess base for copper complexing. The composition of the cuprous salt solutions may, of course, be varied in many ways. The ammoniacal cuprous acetate solution may be prepared by reacting ammonia-ammonium acetate solution with copper shot in a tower together with a controlled amount of air. The concentration of the cuprous ion in the cuprous ammonium acetate solution is in the range of 2.8 to 3.5 grams mols/liter, preferably about 3.

The feed stream may be any dilute olefin-bearing gas, e.g. ethylene-rich stream from a steam cracking unit, which is essentially free of acetylenes and contaminated with carbon monoxide, e.g. 100–3000 p.p.m. (vol.). The stream should be substantially free of hydrogen sulfide, carbon dioxide and, of course, acetylenes. These substances may be removed by known techniques. The feed stream, which should contain at least 5 mole percent of the desired olefin, is fed into an absorption zone, which may be a tower suitable for countercurrently contacting the feed with the absorbent, at the rate of about 0.01 to 0.2 mole/gallon of absorbent. While the absorption zone may range in temperature from about 0° to 120° F. and pressure from about 50 to 500 p.s.i.g., it is usually maintained at about 20°–100° F. and under about 150–300 p.s.i.g. The unabsorbed components in the feed, which are withdrawn from the top of the tower, comprise mainly methane, ethane and hydrogen. If desired, these chemicals may be separated and recovered by techniques well known in the art.

The fat absorbent is withdrawn from the bottom of the tower, passed through a heat exchanger and then introduced into the upper part of a desorption zone wherein the olefin and carbon monoxide are removed. The desorber tower is maintained under desorbing conditions, i.e. at temperatures which are higher than those in the absorption zone and under pressures which are about the same or lower. The pressure in the desorption zone may, of course, be higher than that in the absorber, but such an operation requires very high desorption temperatures which are usually undesirable and uneconomical. The temperatures in the desorber usually range from about 50° to 280° F. and the pressures may be atmospheric to 300 p.s.i.g. or more. The carbon monoxide in the rich absorbent is preferably withdrawn as a side stream in the lower part of the desorber at a temperature that is higher than the olefin stripping temperature. By adjusting the temperature profile of the desorber, the olefin and carbon monoxide can be successively and selectively desorbed from the fat absorbent. In general the temperature in the lower part of the tower should be at least 20° F. and preferably about 50 to 150° F. above the temperature at the top of the desorber. Usually the overhead stream is at about 120 to 180° F. and the bottoms temperature is about 230 to 280° F. Of course, the carbon monoxide can be removed in a separate tower under conditions which favor its removal, e.g. higher temperature and lower pressure, but this is a much less desirable process since it involves the use of additional units and apparatus.

The desorbed olefin may be contacted with cooled lean absorbent, being recycled to the top of the absorber, as reflux liquid to reduce the carbon monoxide content in the overhead product stream. In order to free the olefin product of any remaining carbon monoxide, the overhead gas is water scrubbed to remove ammonia and then passed over a bed of an alkali metal hydroxide, preferably potassium hydroxide, under conditions that favor the selective removal of carbon monoxide from the product stream, i.e. elevated temperature and superatmospheric pressure. Highly satisfactory results have been obtained with potassium hydroxide at temperatures well below the decomposition temperature of ethylene, at pressures of 100–1000 p.s.i.g. with space velocities of 100 to 1000 v./v./hr. For example, by operating at 500° F. and 250 p.s.i.g., carbon monoxide is completely removed from an ethylene stream with potassium hydroxide while complete removal of this impurity did not take place with sodium hydroxide until a temperature of about 750° F. was employed. Moreover, complete removal of carbon monoxide from ethylene can be obtained at temperatures as low as 360° F. when a charcoal support treated with potassium hydroxide is employed. A suitable temperature range for this olefin purification zone is 200° to 600° F.; however, temperatures of 350° to 500° F. are preferred when pressures of 200–400 p.s.i.g. are used. The bed is easily reactivated by treating it with a concentrated solution of the alkali metal hydroxide in accordance with copending patent application S.N. 817,757, filed June 6, 1959. The purified olefin product, e.g. ethylene, is at least 99 mole percent pure and contains less than about 10 p.p.m. (volume) of carbon monoxide. It is highly suitable feed for the manufacture of polyethylene, polypropylene and other processes requiring high purity olefins.

The invention will be now described with reference to the accompanying drawing which is a flow diagram of the process.

An olefin feed, which is a dilute ethylene stream from a steam cracking unit, having the following composition,

| Component: | Mole percent |
|---|---|
| Hydrogen | 15.0 |
| Methane | 42.1 |
| Ethylene | 35.0 |
| Ethane | 7.9 |
| Carbon monoxide, p.p.m. (vol.) | 825 | is introduced near the bottom of absorber 10 at the rate of 1170 moles/hour through pump 11 and line 12. Lean ammoniacal cuprous acetate solution having the following composition is introduced near the top of absorber tower 10 through line 13 at the rate of 100,000 gal./hour.

| Component: | Moles/liter |
|---|---|
| Cupric ion | 0.37 |
| Total copper | 3.29 |
| Ammonia | 10.12 |
| Acetate ion | 4.51 |

The feed and lean cuprous salt solution are contacted in absorber tower 10 countercurrently at a temperature of 20° F. and under a pressure of 200 p.s.i.g. The tail gas which has the following composition is withdrawn from the top of tower 10 through line 14.

| Component: | Mole percent |
|---|---|
| Hydrogen | 23.0 |
| Methane | 61.8 |
| Ethylene | 4.8 |
| Ethane | 10.4 |
| Carbon monoxide, p.p.m. (vol.) | None |

The fat cuprous salt solution is continuously withdrawn from the bottom of absorber tower 10 through line 15 at a temperature of about 20° F., passed through a heat exchanger 16 that raises its temperature to 140° F. and introduced to the top of a packed desorber tower 17 which is at approximately atmospheric pressure. The ethylene in the fat cuprous salt solution is selectively stripped off the upper part of desorber 17 in a first desorption zone 18, and is continuously withdrawn overhead through line 19 at a rate of about 400 moles/hour. Desorption zone 18 contains packing or a plurality of plates which permit a sharp separation of the olefin from the cuprous salt solution. The overhead ethylene product in line 19 is transferred to a conventional water scrubber 20 which removes any ammonia in the ethylene product before it is introduced into purification zone 21 which contains a fixed bed of potassium hydroxide impregnated on activated charcoal. The water is supplied to the scrubber 20 through line 22 and withdrawn from the scrubbing zone via line 23. The scrubbed olefin-rich stream is transferred to compressor 37 via line 24 where it is compressed to 250 p.s.i.g. and is preheated to 500° F. in heat exchanger 38 before it is transferred to zone 21. The potassium hydroxide coated charcoal has a density of 0.22 gram per cubic centimeter, a mesh size of 8 to 10 and contains 0.13 gram of potassium hydroxide per cubic centimeter. Zone 21, which selectively removes any carbon monoxide in the ethylene product, is at 500° F. and under 250 p.s.i.g. pressure. The ethylene product, which is withdrawn overhead through line 25, contains 99.8 mole percent ethylene and less than 10 p.p.m. (vol.) of carbon monoxide.

A concentrated vapor stream of carbon monoxide is continuously removed via line 26 which communicates with vapor space 27 in desorber tower 17 just above the carbon monoxide desorption zone 28 which contains a plurality of plates (or bubble caps). This stream, which is at 230–240° F., contains about 50 mole percent carbon monoxide (0.8 mole/hr.) on an ammonia-water free basis. The carbon monoxide stream in line 26 may be water scrubbed to remove ammonia if desired. A portion of the bottoms in desorber 17 is recycled via line 29 through reboiler 30 which maintains the temperature in the bottom part of the desorber at 255° F. The ammonia recovered from scrubbing the tail gas, ethylene product and CO side stream plus some makeup if necessary, is continuously returned to the system through line 31 to assist in the stripping of the ethylene in the desorber. A lean cuprous salt solution is continuously withdrawn from desorber 17 through line 32, cooled in cooler 33 to 20° F. and recycled to the top of absorber tower 10 through line 13 at a rate of 100,000 gallons/hr. by means of pump 35.

About 10 weight percent of the cooled lean cuprous salt solution in line 32 may be transferred to line 34 which communicates with the top of desorber 17 by means of valve 36 and used as reflux in said desorber.

The specific process described above results in a 93% recovery of high purity ethylene containing only a trace of carbon monoxide. The essence of the invention is the removal of a substantial proportion of the carbon monoxide in the feed by means of the cuprous salt solution. By this method the olefin is more easily purified than by any of the techniques known for removing small amounts of carbon monoxide from olefin gas. By taking off a concentrated carbon monoxide side stream from the desorber, it is possible to regenerate the absorbent solution and recycle it to the absorption zone without experiencing any substantial build up of carbon monoxide in the lean cuprous salt solution. The olefin desorbed from the absorbent is preferably further purified by passing it through a bed of an alkali metal hydroxide on a support.

As mentioned above, it may be advantageous under certain conditions to recycle a part of the cooled lean cuprous salt solution to the top of the desorber as reflux in order to further lower the carbon monoxide content in the ethylene product stream. This may be accomplished by regulating valve 36 to direct the cooled cuprous salt solution in line 32 through line 34 to the top of the desorber 17.

While the concentration and purification of a dilute ethylene stream has been described, it is understood that the process has application to similar olefin streams containing carbon monoxide, and that resort may be had to various modifications and variations of the invention without departing from the spirit of the discovery or the scope of the appended claims.

What is claimed is:

1. Continuous process for extracting and purifying a light olefin in a stream that is rich in said olefin, essentially free of acetylenes and contains an undesirable amount, but no more than about 3000 p.p.m. (vol.), of carbon monoxide which comprises continuously contacting said stream countercurrently with a sufficient amount of an ammoniacal cuprous acetate absorbent solution in an absorption tower at about 5 to 120° F. and a pressure of about 50 to 500 p.s.i.g. to selectively absorb the light olefin and carbon monoxide from the stream, continuously taking off the unabsorbed portion of said stream overhead from the absorption tower, continuously withdrawing fat absorbent solution from the bottom of said absorption tower, and introducing it into the upper part of a desorption tower that has an upper olefin desorption zone and a lower carbon monoxide desorption zone, both desorption zones being at higher temperatures and lower pressure than the temperature and pressure in the absorption tower, continuously desorbing the light olefin from the fat absorbent solution in the olefin desorption zone, continuously desorbing a stream rich in carbon monoxide from the absorbent solution in the lower desorption zone at a temperature that is about 50 to 150° F. lower than the temperature in the upper desorption zone but at substantially the same pressure, recovering the desorbed light olefin which contains only a trace of carbon monoxide, continuously withdrawing lean absorbent solution from the bottom of said desorption tower, cooling the lean solution to approximately the temperature of the absorption tower and recycling at least a part of the cool absorbent to the top of the absorption tower.

2. Process according to claim 1 in which the light olefin contains 2 to 3 carbon atoms.

3. Continuous process for extracting and purifying ethylene in an ethylene-rich stream that is essentially free of acetylenes and contains between about 100 and 3,000 p.p.m. (vol.) of carbon monoxide which comprises contacting said stream countercurrently with a sufficient amount of ammoniacal cuprous acetate absorbent in an absorption tower at about 20 to 100° F. and a pressure of about 150 to 300 p.s.i.g. to selectively absorb the ethylene and carbon monoxide from the stream, continuously taking off the unabsorbed portion of the stream overhead from the absorption tower, continuously withdrawing fat absorbent solution from the bottom of the absorption tower and introducing it into the upper part of a desorption tower which has an upper olefin desorption zone and a lower carbon monoxide desorption zone, both desorption zones being at higher temperatures than the temperature in the absorption zone and under substantially atmospheric pressure, continuously desorbing the ethylene from the fat absorbent solution in the upper desorption zone, continuously desorbing a stream rich in carbon monoxide from the absorbent solution in the lower desorption zone, the temperature in said upper desorption done being about 50 to 150° F. lower than the temperature in the lower desorption zone but at substantially the same pressure, continuously passing the desorbed ethylene which contains a small amount of carbon monoxide through a bed containing an alkali metal hydroxide that selectively removes the carbon monoxide from said ethylene and thereby reduce its carbon monoxide content to less than 10 p.p.m. (vol.), said bed being at a temperature of about 200 to 600° F. and under a pressure of 100 to 1000 p.s.i.g., continuously withdrawing ethylene from said bed having a purity of at least 99 mole percent, continuously withdrawing the desorbed stream rich in carbon monoxide from said lower desorption zone, continuously withdrawing lean absorbent solution from the bottom of the desorption tower, continuously cooling the lean absorbent solution to approximately the temperature of the absorption tower, recycling a part of the cool absorbent solution to the top of the desorption zone to strip the ethylene being desorbed and recycling the remaining part of the cool absorbent to the top of the absorption tower.

4. Process according to claim 3 in which the alkali metal hydroxide which is used to selectively remove carbon monoxide from the desorbed ethylene is potassium hydroxide.

5. Process according to claim 3 in which alkali metal hydroxide which is used to selectively remove carbon monoxide from the desorbed ethylene is potassium hydroxide on an inert support.

References Cited in the file of this patent

UNITED STATES PATENTS

| | | |
|---|---|---|
| 1,977,659 | Watts | Oct. 23, 1934 |
| 2,453,853 | Morrell et al. | Nov. 16, 1948 |

FOREIGN PATENTS

| | | |
|---|---|---|
| 304,345 | Great Britain | Oct. 17, 1927 |